United States Patent [19]
Painter

[11] 3,949,171
[45] Apr. 6, 1976

[54] MULTIPLICATIVE MULTIPLEXER

[76] Inventor: John H. Painter, 1119 Merry Oaks, College Station, Tex. 77840

[22] Filed: July 28, 1975

[21] Appl. No.: 599,382

Related U.S. Application Data

[63] Continuation-in-part of Ser. No. 431,888, Jan. 9, 1974, abandoned.

[52] U.S. Cl. .......... 179/15 R; 179/2 DP; 179/15 A; 179/15 BC; 179/15 BY
[51] Int. Cl.² ........................................ H04J 15/00
[58] Field of Search ........ 179/15 BM, 15 BC, 1 SA, 179/15 A, 15 R, 15 BY, 2 DP, 3; 324/77 R; 325/349, 487

[56] References Cited
UNITED STATES PATENTS

| | | | |
|---|---|---|---|
| 3,032,717 | 5/1962 | Fowler | 179/15 BM |
| 3,626,417 | 12/1971 | Gilbert | 179/15 BM |

OTHER PUBLICATIONS

*Nato Aovkory Group for Aerospace Research & Development No. 139,* "Theory & Application of Kalman Filtering;" Received 4-27-70.

*IEEE Transactions on Aerospace & Electronic Systems;* Vol. AES-6, No. 4; July 1970; "Application of . . . Kalman Filtering . . ." by Salinger; pp. 585–592.

*Primary Examiner*—David L. Stewart
*Attorney, Agent, or Firm*—Pravel & Wilson

[57] ABSTRACT

Communication by multiplicatively multiplexing two signals, one digital data and the other an analog signal such as voice, for simultaneous transmission over a communication path, such as a telephone line.

10 Claims, 6 Drawing Figures

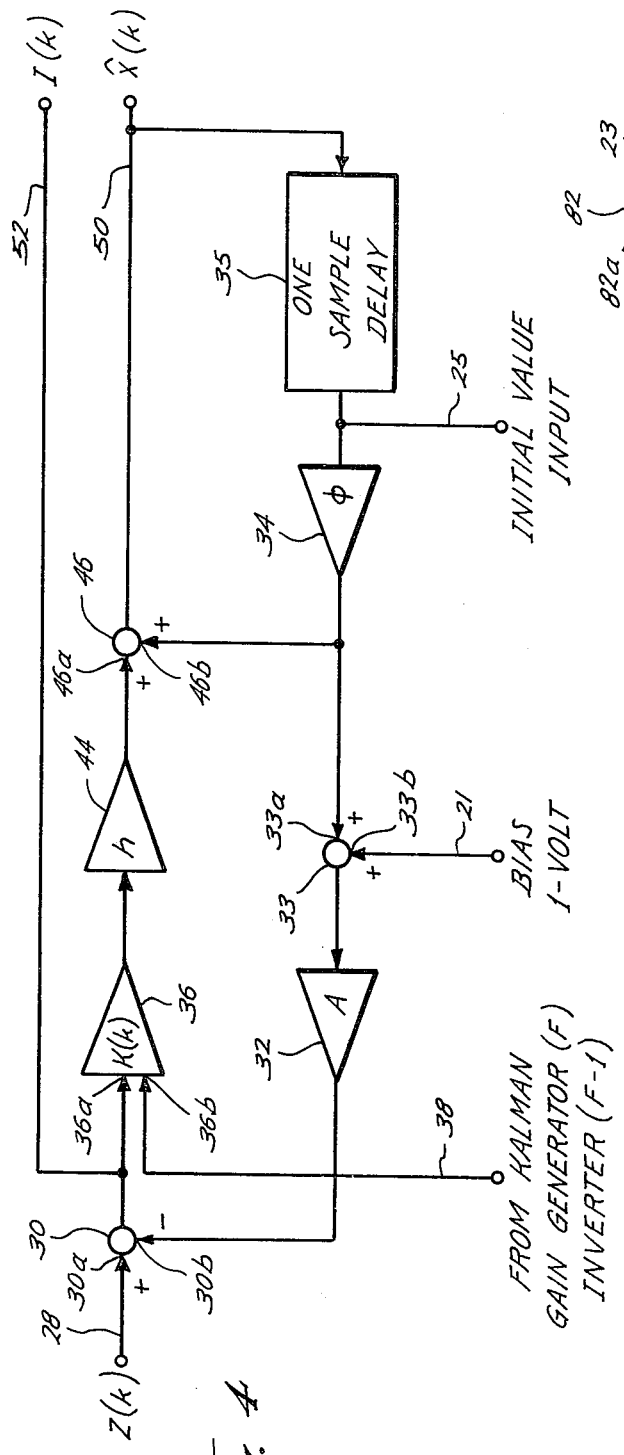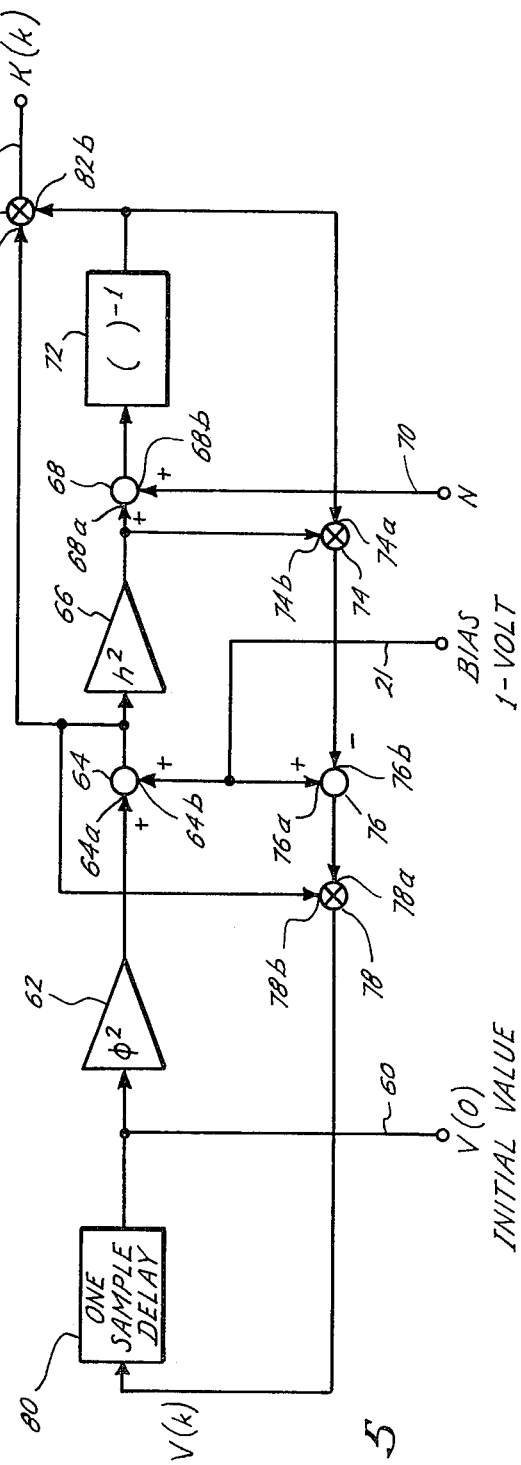

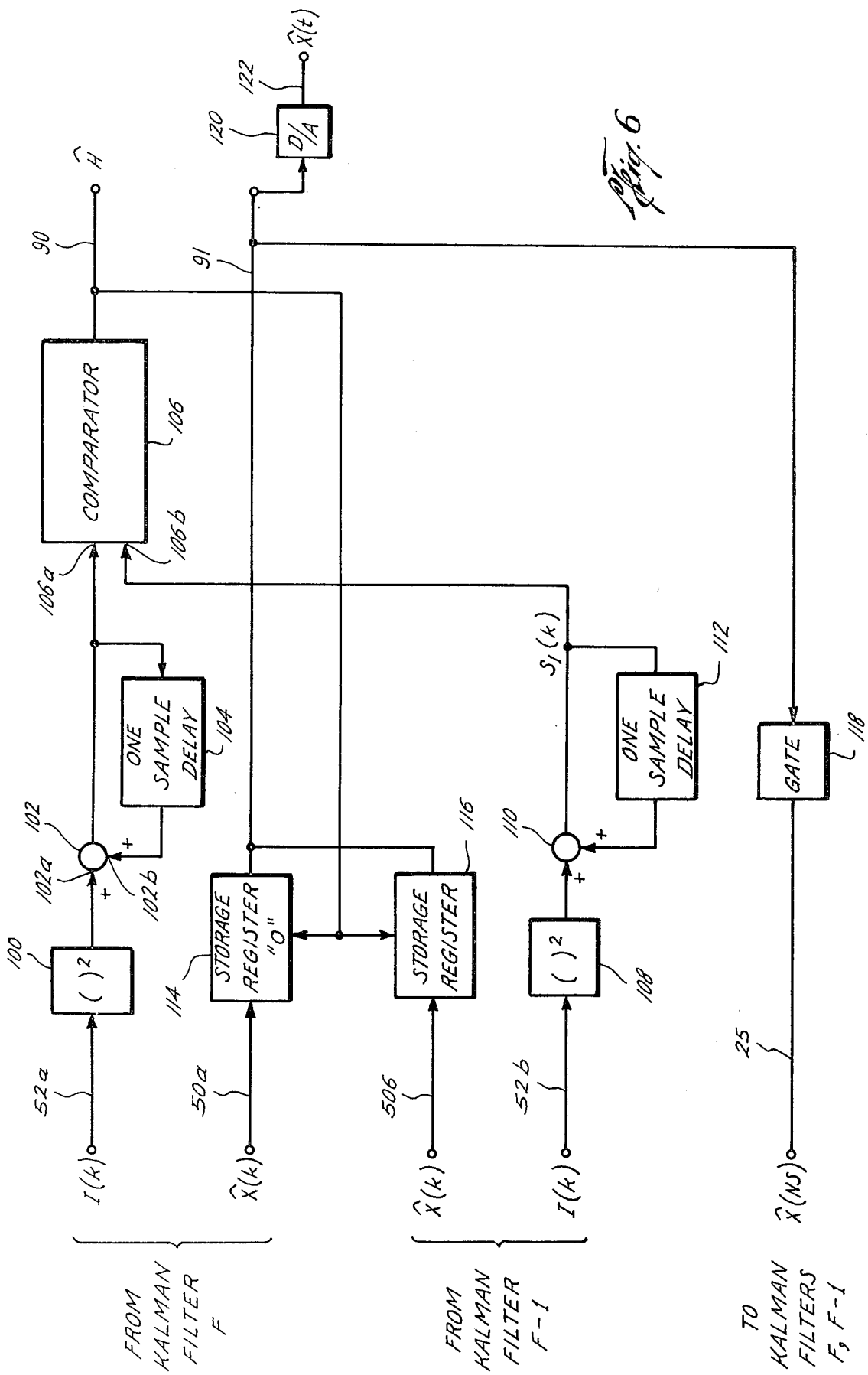

MULTIPLICATIVE MULTIPLEXER

CROSS-REFERENCE TO RELATED APPLICATIONS

This application is a continuation-in-part of co-pending U.S. Pat. application Ser. No. 431,888, filed Jan. 9, 1974, now abandoned.

BACKGROUND OF THE INVENTION

1. Field of the Invention

The present invention relates to multiplexing two signals for simultaneous transmission over telephone lines and other communication paths.

2. Description of the Prior Art

As the cost of installing communication lines increases, it has become desirable to simultaneously send more than one signal over a single communication line between a transmitter and a receiver. Prior art techniques adapted for simultaneous transmission of two signals, such as one of digital data and one analog signal, are frequency division multiplexing and time division multiplexing.

However, in frequency division multiplexing, the digital data was typically in phase shift keyed (PSK) format. Circuitry was required for the PSK signal to be translated to higher frequencies outside the frequency spectrum of the analog signal in order that frequency selective filtering at the receiver could separate the two signals from each other. This type of frequency division multiplexing required either a very wide signal transmission bandwidth or, alternatively, complex frequency translation equipment at the transmitter and highly selective filters at the receiver.

In time division multiplexing the digital data was encoded in a suitable format. The analog signal was then sampled at a required sampling rate, quantized and encoded into a suitable digital code and then multiplexed, or transmitted in interleaved sequence, with the already encoded digital data. Time multiplexing thus required complex sampling and encoding circuitry at the transmitter, a very wide transmission bandwidth and similarly complex sampling and decoding equipment.

SUMMARY OF THE INVENTION

Briefly, the present invention provides a new and improved method and apparatus for communicating two signals over a communications path. One of the two signals is binary digital data in antipodal, baseband format, while the other signal is analog data, such as voice signals.

The two signals are intentionally multiplied together to form a mathematical product of the signals prior to transmission. Neither signal requires a carrier wave, either before or after multiplication. After transmission and reception the two signals in the product signal are demultiplexed from each other using Kalman filtering techniques. The present invention is particularly adapted for sending two signals simultaneously over a telephone line, since the frequency spectra of the two signals may each occupy the frequency band of the other, without hampering demultiplexing at the receiver.

It is an object of the present invention to provide a new and improved method and apparatus for communications of two signals in common over a communications path.

It is an object of the present invention to multiplicatively multiplex two signals onto a single communications path.

BRIEF DESCRIPTION OF THE DRAWINGS

FIG. 4 is a schematic electrical circuit diagram of the Kalman filter processing circuit portion of the receiver of FIG. 3;

FIG. 5 is a schematic electrical circuit diagram of the Kalman Gain Generator circuit portion of the receiver of FIG. 3; and FIG. 6 is a schematic electrical circuit diagram of the logic circuit portion of the receiver of FIG. 3.

DESCRIPTION OF THE PREFERRED EMBODIMENT

Figure 1:
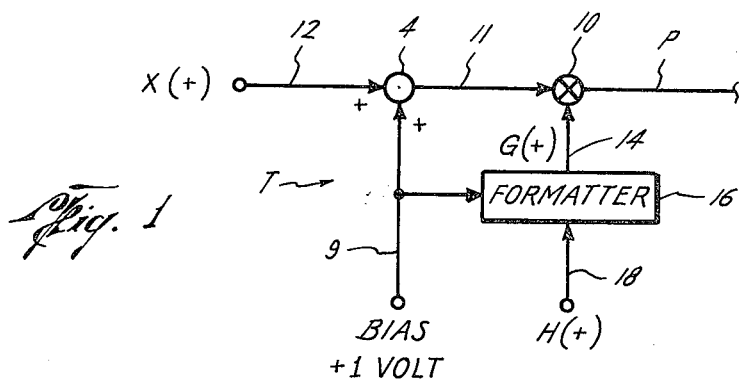
FIG. 1 is a functional electrical circuit diagram of a transmitter according to the present invention.

In the drawings, the letter A designates generally the apparatus of the present invention for communicating two signals over a communications path P. The apparatus A includes a transmitter T (FIG. 1) which receives an input analog signal X which can be, for example, a voice signal.

The transmitter T further receives an input signal H which is binary digital data, preferably having voltage levels of 0 or +1 volts to represent the binary data. Within the transmitter T, the digital signal H is reformatted into a digital signal G, having voltage levels of −1 or +1 volts to indicate the binary data. The formatting of signal G from the signal H converts an H signal of 0 volts into a +1 volt G signal and a +1 volt H signal into a −1 volt G signal. The G signal is in what is defined to be "antipodal, baseband" format. For the purposes of this invention, a signal in "antipodal baseband" format is defined to be a digital signal having binary voltage levels of opposite polarity to represent the two different binary data bits and having baseband frequency spectra or characteristics rather than frequency spectra or characteristics of a carrier signal.

The transmitter T multiplexes the signals X and G together and sends the multiplexed signals X and G over the communications paths P to a receiver R (FIG. 3) where a signal Z is received having included therein noise and other undesirable signal elements occurring as a result of transmission and receipt.

Considering the transmitter T more in detail (FIG. 1), the voice signal X from a suitable voice signal source is routed over an input conductor 12 to a summing junction 4, where the voice signal X is summed with a +1 bias voltage level present on a conductor 9 from a conventional bias power supply. Summing the bias voltage at the summing junction 4 places a nonzero signal on the conductor 11 during those periods when the voltage level of the voice signal X is zero. The sum of the voice signal X and the +1 volt bias voltage is routed over the conductor 11 to an input terminal of a conventional signal product forming device 10.

The digital signal H is in standard single polarity binary, preferably 0 and 1 volt, format from a suitable binary data source and is routed over a conductor 18 to a formatter 16. In the formatter 16, the digital signal H is reformatted into the digital signal G, in a manner to be set forth. The +1 volt bias from the bias source is provided over the conductor 9 to the formatter 16. The digital signal G after re-formatting in the formatter 16 into "antipodal baseband" format is routed from the formatter 16 over the conductor 14 to a second input terminal of the signal product forming device 10.

The signal product forming device 10 of the transmitter T forms a mathematical product of the signals presented thereto at a particular time over conductors 14 and 11, the signal G and the output of summing junction 4, which is the sum of signal X and the +1 volt bias voltage from the conductor 9.

It is to be noted that the mathematical product function formed by the signal product forming device 10 is intentionally formed from two information bearing input signals, a result which prior art signal transmission techniques intentionally avoided. It is further to be noted that the frequency spectra of these signals X and G may each occupy the frequency band of the other. The output of the signal product device 10 is provided to the transmission path P through suitable buffers, amplifiers or line driving circuitry for transmission over the path P.

The multiplicative formation of the product of the signals X and G in the signal product device 10 causes the product function so formed to simultaneously carry the information content of two desired input signals. This form of multiplexing of the present invention is designated for convenience "multiplicative multiplexing". Neither signals X nor G require a carrier wave, either before or after multiplication.

Figure 2:
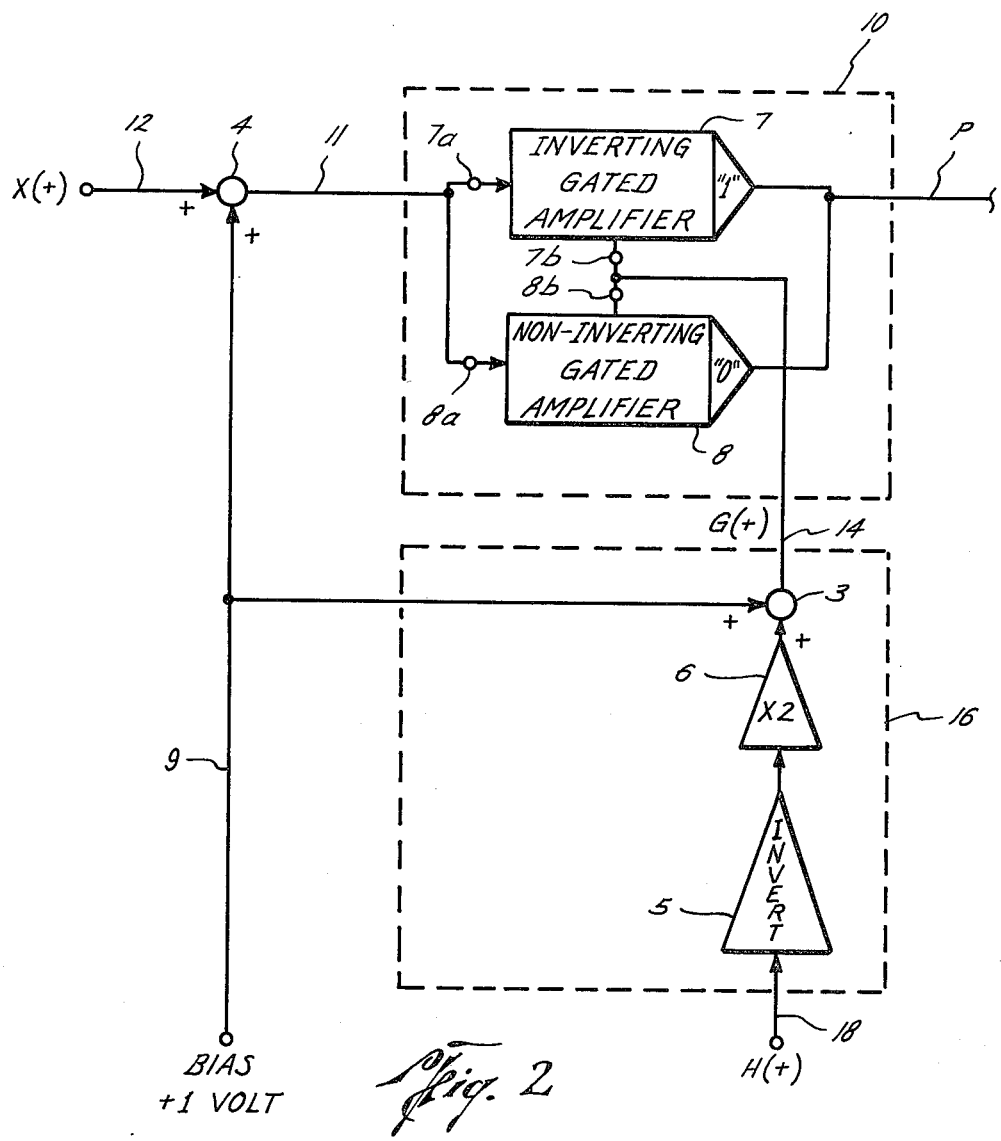
FIG. 2 is a schematic electrical circuit diagram showing the transmitter of FIG. 1 in more detail.

The preferred embodiments of the signal product device 10 and formatter 16 are set forth in FIG. 2. The binary digital signal H, in the single polarity 0 and 1 volt format is routed over conductor 18 to the input of a standard polarity inverting amplifier 5, having unity voltage gain. The negative or inverted signal H is routed from the output of inverting amplifier 5 to the input of an amplifier 6 which has non-inverting voltage gain factor of 2. The output of amplifier 6 is routed to a first input terminal of a summing junction 3. The +1 volt bias voltage from conductor 9 is routed to a second input of the summing junction 3. When the input binary signal H($t$) is 0 volts, the output of the summing junction 3 in the formatter 16 is +1 volt, since the output of amplifier 6 is 0 volts. When the input binary signal H($k$) is +1 volts, the output of amplifier 6 is −2 volts, and the output of summing junction is −1 volt. The output of the summing junction 3 of formatter 16 is thus the binary digital signal G formatted into "antipodal baseband" format, as defined above, which is routed over a conductor 14 to signal product device 10. It should be understood that if the single polarity binary signal levels are different from 0 and +1 volts, appropriate adjustments in the voltage level of the bias voltage on conductor 9 and the gain factors of amplifiers 5 and 6 may be made.

In the preferred embodiment of the product device 10, the sum of voice signal X and +1 volt bias is received from the output of the summing junction 4 over a conductor 11, and supplied in parallel to input terminals 7a and 8a of conventional on-off gating amplifiers 7 and 8, respectively. The output of the formatter 16 is provided over conductor 14 to on-off control inputs terminals 7b and 8b, of gating amplifiers 7 and 8, respectively.

When the voltage on the conductor 14 presented at control inputs 7b and 8b is negative, gating amplifier 7 is activated and transmits the voltage on conductor 11 presented at input terminal 7a, with unity, inverting voltage gain, to the transmitting path P. When the voltage at input 7b, is positive, gating amplifier 7 is turned off and produces no output.

Conversely, the gating amplifier 8 transmits the voltage presented at input terminal 8a, with unity, non-inverting voltage gain, when the voltage on conductor 14, presented at control terminal 8b is positive, activating the gating amplifier 8. Gating amplifier 8 is turned off and produces no output when the voltage at control terminal 8b is negative.

Hence, the output of signal product device 10 is the sum of voice signal X and +1 volt bias voltage, passed through gating amplifier 7, with inverted polarity, when the digital signal G on conductor 14 is +1 volt. The output of device 10 is the sum of voice signal X and +1 bias voltage, passed through gating amplifier 8, with non-inverted polarity, when digital signal G on conductor 14 is −1 volt. The output of signal product device 10, routed to transmission path P, is thus the mathematical product of summed voice signal X and +1 bias voltage multiplied by the digital signal G. During periods of zero voltage level in the voice signal X, the output of product device 10 is the product of digital signal G times the +1 volt bias, or merely the digital signal G itself.

The receiver R (FIGS. 3–6) receives the product signal Z from the communications path P and demultiplexes the two signals X and H in the received product signal from each other so that the two signals sent in common over the communications path P may be separately processed, stored or otherwise used after separation. With the present invention, it has been found that the Kalman filtering techniques which are being used in communications and signal processing, such as to remove multipath noise from digital data, can be adapted for use to separate the two signals simultaneously sent over the signal communications path P. The Kalman filtering is used to separate the two components of the mathematical product function Z so formed in the transmitter T after such function has been sent over the communications path P from the transmitter T to the receiver R. The Kalman filtering techniques of the receiver R, to be set forth below, recover the sequence of digital 1's and 0's in the digital data in the input signal H as well as a filtered version of the analog data in the input signal X.

Considering the receiver R more in detail, a sample and hold circuit 20 receives the input signal Z($t$) to the receiver R from the communications path P. Suitable conventional filters, amplifiers and buffers may be included to process and adjust signal levels of the signal Z($t$) after receipt over the transmission path P if desired. The sample and hold circuit 20 periodically produces a sampled version of the received signal Z($t$), retaining such sample for a prescribed sampling interval. Such sample is designated Z($k$), where $k$ denotes the number of the present sample. The sample and hold circuit 20 receives a clock signal over an input conductor 22 to control the sampling. The clock signal is synchronized with the incoming signal over the communications path P in the conventional manner using conventional synchronization circuitry. The remaining circuitry of the receiver R are additionally so synchronized with the incoming signal, as indicated by an input signal over a common conductor 22 to the remaining circuitry of the receiver R.

An analog to digital, or A-to-D, converter 24 receives the signal Z(k) present at the output of the sample and hold circuit 20 over an input conductor 26. The converter 24 converts the amplitude of the signal so presented on the conductor 26 into a suitable digital code, providing such signal over an output conductor 28 in parallel to two Kalman Filter processing circuits F and F-1. The Kalman Filter processing circuits F and F-1 form, in a manner to be set forth below, two output functions which are provided to an evaluation or decision logic circuit L (FIG. 3) to decode and separate the digital data in the input signal H from the analog data in the input signal X to the apparatus A.

The Kalman Filter processing circuit F forms two output signals: an output signal $\hat{x}(k)$, the filtered value of the $k$th sample of the voice signal X, contained indiscernibly in the product signal z(k) presented thereto over the conductor 28, and an error signal I(k), the dynamic tracking error voltage which Kalman Filter circuit F develops at the kth sample time in filtering voice signal X. The two output functions so formed are processed in the decision logic circuit L in a manner to be set forth below.

In a like manner, the Kalman Filter circuit F-1 forms two output signals: an output signal $\hat{x}(k)$ representing the filtered value of the input signal provided to the filter F-1, and an error signal I(k). For convenience, the error signals I(k) are labeled "Innovations", as these signals are defined in the Kalman filtering art. The outputs $\hat{x}(k)$ and I(k) from Filter F and the outputs $\hat{x}(k)$ and I(k) from Filter F-1 are all routed to Logic Circuit L to be processed in a manner to be set forth below.

It is well known that Kalman Filters track the voice signal X in a manner which minimizes the sum of the squares of the error voltage I(k) so long as the polarity of the voice signal X is known. In the present invention, voice signal X is multiplied by binary signal G, which has only values +1 or −1. When signal G has value −1, the polarity of signal X is inverted. When signal G has value +1, the polarity of signal X is not inverted. Thus, the polarity of the signal X represents the value of the signal G.

In the present invention, Kalman Filter circuits F and F-1 both process input signal Z in an attempt to track input signal X. Kalman Filter circuit F is designed to track voice signal X when signal G has value +1. Kalman Filter circuit F-1 is designed to track voice signal X when signal G has value −1. During any given binary digital signal period, signal G must be either +1 or −1. If, during the given signal period, signal G has value +1, Kalman Filter circuit F tracks input signal X in such a manner that the sum of the squares of tracking error signal I(k) is minimum. During the same period, the sum of the squares of the tracking error signal I(k) from Kalman Filter circuit F-1 is not minimum and must be greater than for Kalman Filter circuit F. If during the given signal period signal G has value −1, the converse applies and the sum of the squares of tracking error signal I(k) is less for Kalman Filter circuit F-1 than for Kalman Filter circuit F.

Logic Circuit L processes the tracking error signals I(k) from both Filter circuits F and F-1 in a manner to be set forth below. Circuit L computes the sum-squared values of tracking error signal I(k) from both Filter circuits F and F-1. At the end of each binary digital signal period, Circuit L compares the values of sum-squared tracking error from Filter circuits F and F-1. If the sum-squared tracking error from Filter circuit F is less than that from Filter circuit F-1, Circuit L forms an output signal which indicates that Filter F was correctly tracking signal X with non-inverted polarity, and further that digital signal G, reformatted from input digital signal H, had value +1, and thus that signal H had a binary data value 0. If the sum-squared tracking error from Filter F-1 is less than that from Filter F, Circuit L forms an output signal which indicates that Filter circuit F-1 was correctly tracking signal X with inverted polarity, and also that reformatted digital signal G had value −1, and thus that input digital signal H had binary data value 1.

Logic Circuit L periodically provides initialization signals to Filters F and F-1 over a conductor 25. Such initialization signals are for the purpose of restarting the filters at the beginning of each succeeding digital signal decision period, as set forth below. A Kalman Gain Generator KGG provides Kalman Filter circuit F with the variable gain function $\kappa(k)$ over a conductor 23, as set forth below. The variable gain function $\kappa(k)$ from conductor 23 is also inverted in inverting amplifier 29 to be provided to Kalman Filter circuit F-1. Circuits 20, 24, F, F-1, L and KGG are all provided with a synchronizing clock signal in the standard manner over the conductor 22. Kalman Filter circuits F and F-1 and Generator KGG are also provided with a +1 volt bias voltage over conductor 21, for purposes set forth below.

Logic circuit L processes the various referenced inputs to produce outputs $\hat{H}$, an estimate of the last detected digital signal H, and $\hat{x}$, an estimate of the voice signal X. The manner of processing is set forth below.

The Kalman Filters F and F-1 are shown schematically (FIGS. 3 and 4), since the functions performed therein can be performed in a special purpose computing circuit of the type set forth below or, alternatively, in a properly programmed general purpose digital computer. As is known, the Kalman filtering operation processes incoming signals to form the Innovations, as these signals are defined in the Kalman filtering art, representative of estimated errors in the tracking filter. These estimated errors are used to reset and correct the filter in processing the incoming signals for each succeeding sample. Further information concerning examples of Kalman filtering are contained, for example, in *Estimation Theory With Applications to Communications and Control*, Sage and Melsa, McGraw-Hill Book Company, 1971; and "Recursive Ideal Observer Detection of Known M-Ary Signals in Multiplicative and Additive Gaussian Noise", Painter and Gupta, I.E.E.E. Transactions on Communication, August, 1973, pages 948–953.

Because of the processing performed in the transmitter T to obtain a comparatively simple form product signal Z from the digital data signal G and the analog signal X, the Kalman filter processing performed in Kalman Filters F and F-1 and in Kalman Gain Generator KGG, is much more readily implemented than that usually encountered in the art. Processing functions governing the operation of Filters F and F-1 and Generator KGG are tabulated below as equations (1).

$$\hat{x}(k) = \phi \cdot \hat{x}(k-1) + h \cdot \kappa(k) \cdot I(k)$$

$$I(k) = Z(k) - A \cdot [1 + \phi \cdot \hat{x}(k-1)] \tag{1}$$

$$\kappa(k) = B \cdot [\phi^2 \cdot v(k-1) + 1] \{ [\phi^2 \cdot v(k-1) + 1] \cdot h^2 + N \}^{-1}$$

$$\frac{v(k)}{\{1-[\phi^2 v(k-1)+1]\cdot h^2\cdot\{[\phi^2\cdot v(k-1)+1]\cdot h^2+N\}^{-1}\}\cdot[\phi^2\cdot v(k-1)+1]}$$

In equations (1), $\hat{x}(k)$ represents the present ($k$th sample) estimate of the voice signal X in the filter circuits, while $\hat{x}(k-1)$ represents the last previous ($k-1$st sample) estimate of voice signal X and $I(k)$ represents the present filtering error voltage. $Z(k)$ represents the present input data sample to the Kalman Filter circuits. $\kappa(k)$ represents the present value of the Kalman Filter variable gain function from the gain generator KGG. $v(k)$ represents the present value of the variance of error with which the Kalman Filter circuit is estimating voice signal X. $\phi$, $h$, $A$, $B$ and $N$ are design constants to be prescribed as set forth below. The processing functions described by equations (1) are analagous to those describing a single-pole low-pass filter, in the time-invariant filtering art.

The Kalman Filter circuits F and F-1 contain like functional elements, operating in a like manner to each other in processing the input signal $Z(k)$ from the converter 24 (FIG. 3), with the exception that the filter F bases its operation on the assumed presence of a digital "0" in the incoming signal, whereas the filter F-1 bases its operation on the assumption of a digital "1" in the incoming signal. Since the Filters F and F-1 operate in a like manner, only one filter circuit (FIG. 4) is set forth in the drawings for the purpose of explanation of such processing.

In Kalman filter processing in the filters F and F-1, a digital subtractor 30 (FIG. 4) receives the incoming signal $Z(k)$ from the conductor 28 at a positive input terminal 30a and a predicted value of such signal at a negative input terminal 30b from an amplifier 32. The amplifier 32 has voltage gain constant A. The constant A has value +1 in Filter F and has value −1 in Filter F-1. The amplifier 32 is driven by the sum, from a digital summing circuit 33, of a +1 volt bias voltage on a conductor 21 and the output of an amplifier 34. The amplifier 34 has voltage gain constant $\phi$, which is prescribed as set forth below. The amplifier 34 is driven by the output of a one-sample delay circuit 35, whose input is the present ($k$th) filtered estimate $\hat{x}$ of the voice signal X. The estimate $\hat{x}$ is produced by a digital summing circuit or summer 46, whose input at one positive terminal 46b thereof is the output of amplifier 34. The input to a positive terminal 46a of the summing circuit 46 is the output of amplifier 44. The amplifier 44 has voltage gain $h$, a constant to be prescribed as set forth below. The input to amplifier 44 is the voltage output of the Kalman variable gain amplifier 36, having voltage gain $\kappa(k)$ as prescribed in equations (1). Voltage gain $\kappa(k)$ is generated in Kalman Gain Generator KGG in a manner to be set forth and routed to amplifier 36 over conductor 38, to a gain terminal 36b. An input terminal 36a of amplifier 36 receives the Innovations $I(k)$ or error signal produced by digital subtractor 30.

Periodically, an initializing voltage is routed from Logic Circuit L over conductor 25 to the input of amplifier 34 for purposes and in a manner to be set forth below.

The Kalman Filters F and F-1 thus each receive the input signal $Z(k)$ from the converter 24 (FIG. 3), a +1 volt bias voltage over conductor 21, periodic initializing (re-setting) voltage over conductor 25, and Kalman voltage gains $\kappa(k)$ over conductor 38. In Kalman Filter F, the voltage gain $\kappa(k)$ is the signal produced directly by the Kalman Gain Generator KGG. In Kalman Filter F-1, the voltage gain $\kappa(k)$ is the signal produced by the Generator KGG and subsequently inverted in polarity by an inverting amplifier 29. Accordingly, in Kalman Filter F, amplifier 32 has voltage gain A of +1. In Kalman Filter F-1, amplifier 32 has voltage gain A of −1. Kalman Filters F and F-1 are periodically reset with identical initializing voltages over conductor 25, in a manner to be set forth below. The same gain constants, $h$ and $\phi$, are used in both filters F and F-1. The values of $h$ and $\phi$ are prescribed as set forth below.

Both filters F and F-1 produce as outputs the filter error voltage $I(k)$ and filtered voice signal $\hat{x}(k)$. The specified filter gain function $\kappa(k)$ and gain constant A in Filter F is equivalent to an assumption that the digital signal H, present in data Z, is a binary "0". The specified filter gain function $\kappa(k)$ and gain constant A in Filter F-1 is equivalent to an assumption that the digital signal H, present in data Z, is a binary "1". Filters F and F-1 thus produce their specified outputs under the cited opposing assumptions about digital signal H. During any given digital signal processing period, only one of the filters F and F-1 is operating under a correct assumption. At the end of each specified digital signal processing period (of length equal to the duration of a binary digit), Logic Circuit L produces a decision as to the binary digit present in the data Z. Such decision is used to reset both filters F and F-1 for operation during the succeeding digit period, in a manner set forth below. Also, such decision selects which of the outputs of Filter circuits F and F-1 is the correct voice output signal $\hat{x}$. Thus, the Filter circuits F and F-1 each implement the algorithms defining the functions $\hat{x}(k)$ and $I(k)$ in equations (1) above.

Considering the Kalman Gain Generator KGG more in detail (FIG. 5) an initial value, $v(0)$, is routed over a conductor 60 to the input of an amplifier 62 before the first data sample is to be processed by Filters F and F-1. Thereafter, during subsequent sample processing times, no further initialization values are provided to amplifier 62 over the conductor 60. The prescribed value for initialization value $v(0)$ is set forth below. Initial value $v(0)$ is amplified in amplifier 62 with voltage gain $\phi^2$, where $\phi$ is the gain constant of amplifier 34 in the Filter circuits F and F-1. The output of amplifier 62 is routed to a first positive input terminal 64a of digital summing circuit or summer 64. A +1 volt bias voltage from the conductor 21 is furnished to a second positive input terminal 64b. The output of summer 64 is routed to an amplifier 66, which has voltage gain $h^2$, where $h$ is the gain constant of the amplifier 44 in the Filter circuits F and F-1. The output of amplifier 66 is routed to a positive terminal 68a of digital summing circuit of summer 68. A positive terminal 68b of the summer 68 receives a constant voltage N over conductor 70. The output of summer 68 is transmitted to an input of a reciprocal forming circuit 72. The output of the reciprocalforming circuit 72, which is the mathematical reciprocal of its input, is routed to a first terminal 74a of a digital multiplier 74. A second terminal 74b of the multiplier 74 receives the output signal of the amplifier 66. The output of the multiplier 74, which is the mathematical product of its two inputs, is routed to a negative terminal 76b of digital subtractor 76. A positive terminal 76a of the subtractor 76 receives the +1 volt bias voltage over conductor 21. The output of the subtractor 76 drives an input terminal 78a of a digital multiplier 78. A second terminal 78b of the multiplier 78 receives the output signal of the summer 64. The output signal $v(k)$ of multiplier 78 is the present ($k$th sample) value of the Kalman Filter tracking error variance. The output signal $v(k)$ is introduced into an input of a one-sample delay circuit 80. The output of the circuit 80 at the next sampling time drives the input of the amplifier 62 to repeat the above-described operation.

Figure 3:
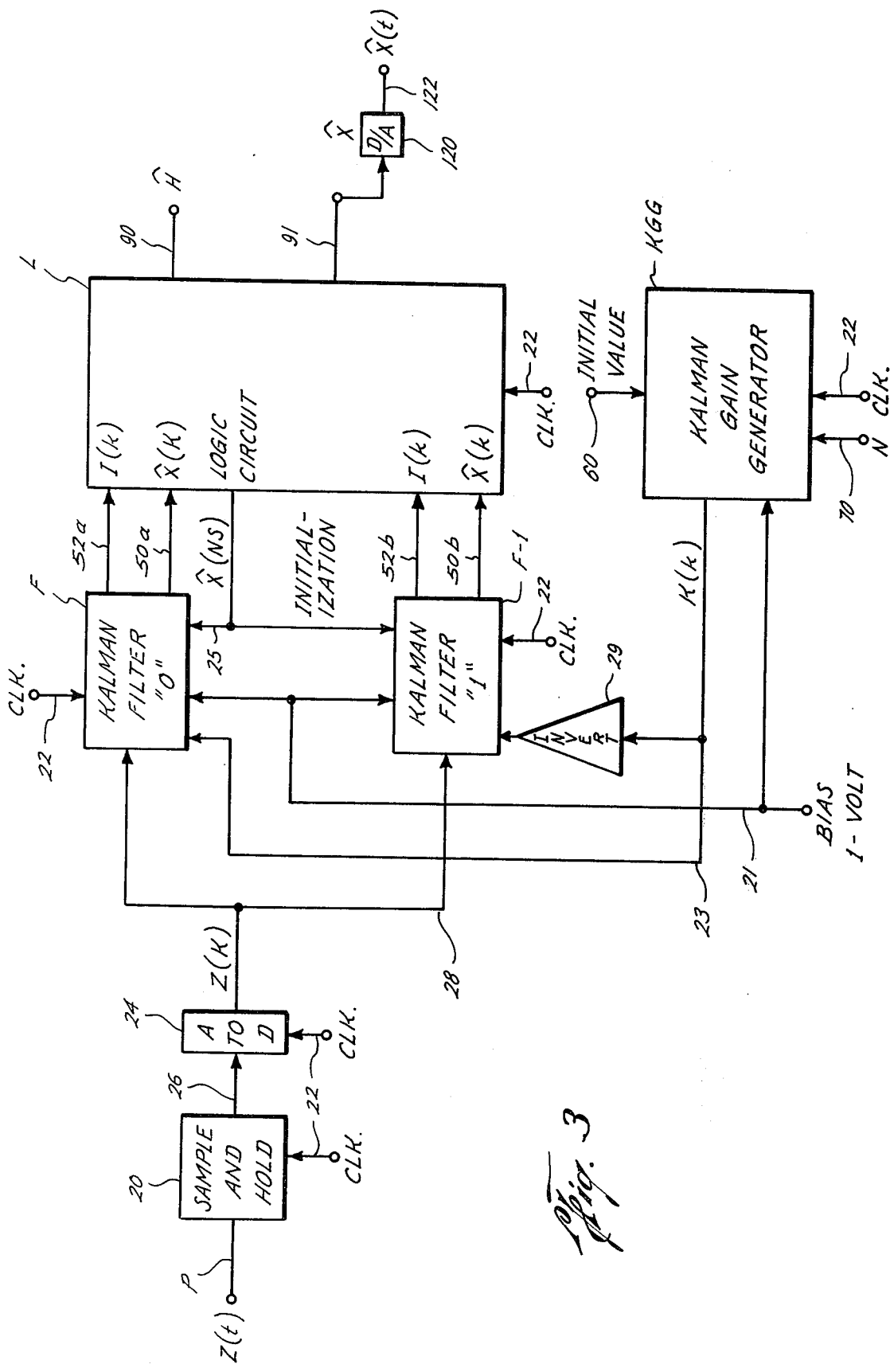
FIG. 3 is a schematic electrical circuit diagram of a receiver according to the present invention.

For the first and succeeding sample times, a digital multiplier 82 forms the variable Kalman gain function $\kappa(k)$. An input terminal 82a of the multiplier 82 receives the output of summer 64, while an input terminal 82b receives the output of reciprocal-forming circuit 72. The gain function $\kappa(k)$ so formed in multiplier 82 is the mathematical product of the two inputs. The operations of Kalman Gain Generator KGG to form the functions $\kappa(k)$ and $v(k)$ are in accordance with and governed by the second two algorithms of equations (1) previously described. The design constant $B$ in equations (1) has value +1 when $\kappa(k)$ is routed to filter F and has value −1 when $\kappa(k)$ is routed to Filter F-1. The value $B=-1$ is implemented by inverting amplifier 29 (FIG. 3). The prescribed value of voltage N on conductor 70 is set forth below.

Thus, in the manner set forth above, the Kalman Gain Generator KGG (FIG. 5) processes an initial value $v(0)$ from conductor 60, a +1 volt bias from conductor 21 and a constant voltage level N from conductor 70 to form the varying Kalman gain function $\kappa(k)$ as an output on conductor 23 to the Filter circuits F and F-1.

The Logic Circuit L (FIG. 3) receives the output signals from Kalman Filters F and F-1 in the manner set forth above. After processing a prescribed number NS of samples obtained during a data bit interval for one bit period of the digital signal H, the Circuit L produces a signal representing a decision as to which binary data value, 0 or 1, was present in signal H during the processing period. The signal representing this decision is produced as an output of Logic Circuit L on a conductor 90 and is the appropriate binary value for signal $\hat{H}$. During the processing period, Circuit L stores, in appropriate registers, the NS sample values of filtered voice signal $\hat{x}(k)$ from both Filters F and F-1. Only one of these stored NS sample sets of values for $\hat{x}(k)$ represents the true voice signal. The true set is that produced by the Kalman filter having the correct assumption as to the data value of signal H during the processing period.

When the decision is made in the Logic Circuit L as to the digital symbol present in the H signal, an output signal is provided on conductor 91 representing the sequence of voice signal estimates $\hat{x}(k)$ taken from the correct stored set. Logic Circuit L also routes the last stored estimate $\hat{x}(NS)$ from the correct set over line 25 to the input of amplifiers 34 to reinitialize Kalman Filters F and F-1 for the subsequent data processing period.

Logic Circuit L produces two decision signals, having the form given by the algorithm in equation (2).

$$S(k) = \sum_{i=1}^{k} I^2(i) \quad (2)$$

where $I(i)$ is the $i$th sample of the Innovations (error signal) in Kalman Filter F or F-1. The decision signal so produced from the Innovations of Kalman Filter F has the form of the algorithm in equation (2) and is denoted $S_0(k)$. Similarly, the decision signal so formed from the Innovations of Kalman Filter F-1 is denoted $S_1(k)$. Logic Circuit L computes the values of the two decision signals $S_0(NS)$ and $S_1(NS)$ for the last set of NS sample values of analog data samples processed during the period of digital signal H. Circuit L then forms a signal representing the decision as to whether digital signal H had value 0 or 1 during that period according to the algorithm in equation (3):

$$S_0(NS) \text{ greater than } S_1(NS) \text{ implies H equals } 1 \quad (3)$$
$$S_1(NS) \text{ greater than } S_0(NS) \text{ implies H equals } 0$$

In the manner of the algorithm in equation (3) above, the binary symbol is chosen for signal H for which the corresponding Kalman Filter sum-squared tracking error is least.

Considering the decision Logic Circuit L more in detail (FIG. 6), Innovations $I(k)$ from Kalman Filter F is routed over conductor 52a to the input of a digital squaring circuit 100. The output of squaring circuit 100 is the squared value of the input thereto and drives a positive terminal 102a of digital summing circuit summer 102. The output of the summer 102 is fed back through a one-sample delay circuit 104 to a second positive terminal 102b of the summer 102. The output of the summer 102 also drives an input terminal 106a of a conventional digital comparator circuit 106.

In a like manner to that set forth above for the signal $I(k)$ from the Kalman Filter circuit F, Innovations $I(k)$ from Kalman Filter circuit F-1 is routed over a conductor 52b, squared in a squaring circuit 108, accumulated in summer 110 with the output of a one-sample delay circuit 112 and routed to an input terminal 106b of the comparator 106.

The sequence of sample estimates $\hat{x}(k)$ of the voice signal X is routed from Kalman Filter circuit F over conductor 50a to be stored in a storage register 114. Similarly, the sequence of sample estimates $\hat{x}(k)$ of the voice signal X from Kalman Filter F-1 is routed over conductor 50b to be stored in a storage register 116.

After the last of the set of NS samples of a current digital signal period of the signal H has been processed, comparator 106 compares the values of the decision signals $S_0(NS)$ and $S_1(NS)$ present at terminals 106a and 106b, respectively, and produces as an output the appropriate value, which in turn represents appropriate value of digital signal $\hat{H}$ in accordance with the algorithm in equation (3). The output digital signal estimate $\hat{H}$ then present on conductor 90 thus has a digital value "0" or "1" which is provided to storage registers 114 and 116 over a conductor 90b. The presence of a "0" on conductor 90b causes storage register 114 to read out the stored set of estimated values $\hat{x}(k)$ of the voice signal X from Kalman Filter F onto line 91, while inhibiting storage register 116. In contrast, the presence of a "1" on line 90 causes storage register 116 to read out the stored set of estimated values $\hat{x}(k)$ from Kalman Filter F-1 while inhibiting register 114.

A gate 118 is driven by the output $\hat{x}(k)$ on a conductor 91 and reads out the final estimate $\hat{x}(NS)$ of the voice signal X onto conductor 25 from whichever of the storage registers 114 and 116 responds to the signal on conductor 90b. Conductor 25 provides the output $\hat{x}(NS)$ to the Kalman Filter circuits F and F-1 to reset them for the next subsequent digital signal processing period as set forth above. To restore the voice or analog signal estimate $\hat{x}(k)$ into analog form, $\hat{x}(k)$ is processed through a conventional Digital to Analog Converter 120 to produce the correct estimate $\hat{x}(t)$ of the analog voice signal X, at output terminal 122.

In the description set forth above, the principles of operation and design of the Multiplicative Multiplexer and associated Demultiplexer have been specified except for design constants, which include a time duration of a binary input signal digit in the number of NS data samples to be taken during each signal digit period, and the resulting time interval between samples. Also to be specified are the Kalman Filter parameters, $\phi$, $h$ and N and the filter initializing values $v(0)$ and $\hat{x}(0)$. Table I below sets forth the values of the various constants suitable for the preferred embodiment of the invention.

TABLE I
DESIGN CONSTANTS

| | |
|---|---|
| Binary Digit Duration | :5 × 10⁻⁴ seconds/bit |
| Sampling Rate | :10 samples/bit |
| Sample Interval | :5 × 10⁻⁵ seconds/sample |
| $\phi$ | :0.456 |
| h | :0.890 |
| N | :10⁻³ |
| v(0) | :1. |
| $\hat{x}(0)$ | :0. |

In this manner, two signals, one containing digital data and the other an analog signal such as voice, may be multiplied together, even though their frequency spectra overlap, with a suitable signal product forming device 10 at the transmitter T and sent over the communications path P simultaneously. The band width required for the multiplicative multiplexing technique of the present invention is substantially less than the transmission bandwidth required for either prior art frequency division multiplexing or time division multiplexing, representing the sum of the highest frequencies present in the spectra of the two desired signals. In addition, neither signal requires a carrier wave, either before or after multiplication. Further, the transmitter T can be readily obtained due to the electrical simplicity of the multiplexing technique used, in accordance with the present invention.

It should be understood that these design constants may be varied and adjusted depending on the type and magnitude of analog signal X, the data rate and voltage levels of the digital signal H, and other factors, if desired.

The foregoing disclosure and description of the invention are illustrative and explanatory thereof, and various changes in the size, shape, materials, wiring connections and contacts as well as in the details of the illustrated circuitry and construction may be made without departing from the spirit of the invention.

I claim:

1. An apparatus for communicating two signals having overlapping spectra over a communications path, comprising:
    a. means for multiplying the two signals directly together in the absence of a carrier signal to form a product signal for transmission;
    b. means for transmitting the product signal over the communications path;
    c. means for receiving the product signal from the communications path; and
    d. means for demultiplexing the two signals in the received product signal from each other wherein two signals are sent in common over the communications path.

2. The apparatus of claim 1, wherein one of the two signals is digital data and the other of the two signals is analog data, and wherein:
    said means for multiplying comprises means for multiplying the analog data with the digital data.

3. The apparatus of claim 2, wherein the analog data is a voice signal and wherein:
    said means for multiplying comprises means for multiplying the voice signal directly with the digital data.

4. The apparatus of claim 1, wherein said means for multiplying comprises:
    gated amplifier means for forming a mathematical product of the two signals.

5. The apparatus of claim 1, wherein the communications path is a telephone line and wherein:
    said means for transmitting comprises means for transmitting the product signal over the telephone line.

6. The apparatus of claim 1, wherein one of the two signals forming the product signal is a digital signal representing binary data values by signal levels of opposite polarity during a sampling period and the other of the two signals is analog data, and wherein said means for demultiplexing the two signals comprises:
    a. first Kalman filter processing means for processing the product signal based on an assumed positive polarity for the first binary data value of the digital signal and generating a plurality of sampled values of the analog data and a plurality of sampled values of a first error signal within the sampling period;
    b. second Kalman filter processing means for processing the product signal based on an assumed negative polarity for the second binary data value for the digital signal and generating a plurality of sampled values of the analog data and a plurality of sample values of a second error signal within the sampling period;
    c. evaluating means, said evaluating means including:
        1. comparing means for comparing sampled values of the first and second error signals;
        2. means for indicating which of the sampled values of the first and second error signals in said comparing means is larger and thereby represents the correct binary data value for the digital signal, with the polarity of the digital signal so represented corresponding to the assumed polarity of product signal in one of said Kalman filter processing means to provide the correct sampled value of the analog data.

7. A transmitter for sending two signals having overlapping spectra over a communications path, comprising:
    a. means for multiplying the two signals directly together in the absence of a carrier signal to form a product signal for transmission; and
    b. means for transmitting the product signal over the communications path.

8. A method of communicating two signals having overlapping spectra over a communications path, comprising the steps of:
    a. multiplying the two signals directly together in the absence of a carrier signal to form a product signal for transmission;

b. transmitting the product signal over the communications path;
c. receiving the product signal from the communications path; and
d. demultiplexing the two signals in the received product signal from each other, wherein two signals are sent in common over the communications path.

9. The method of claim 8, wherein said step of multiplying comprises the step of: forming a mathematical product of the two signals.

10. A method of sending two signals having overlapping spectra over a communications path, comprising the steps of:
a. multiplying the two signals directly together in the absence of a carrier signal to form a product signal for transmission; and
b. transmitting the product signal over the communications path.

* * * * *